Sept. 29, 1942.   E. GENTE   2,297,210
GAS TURBINE
Filed July 24, 1939
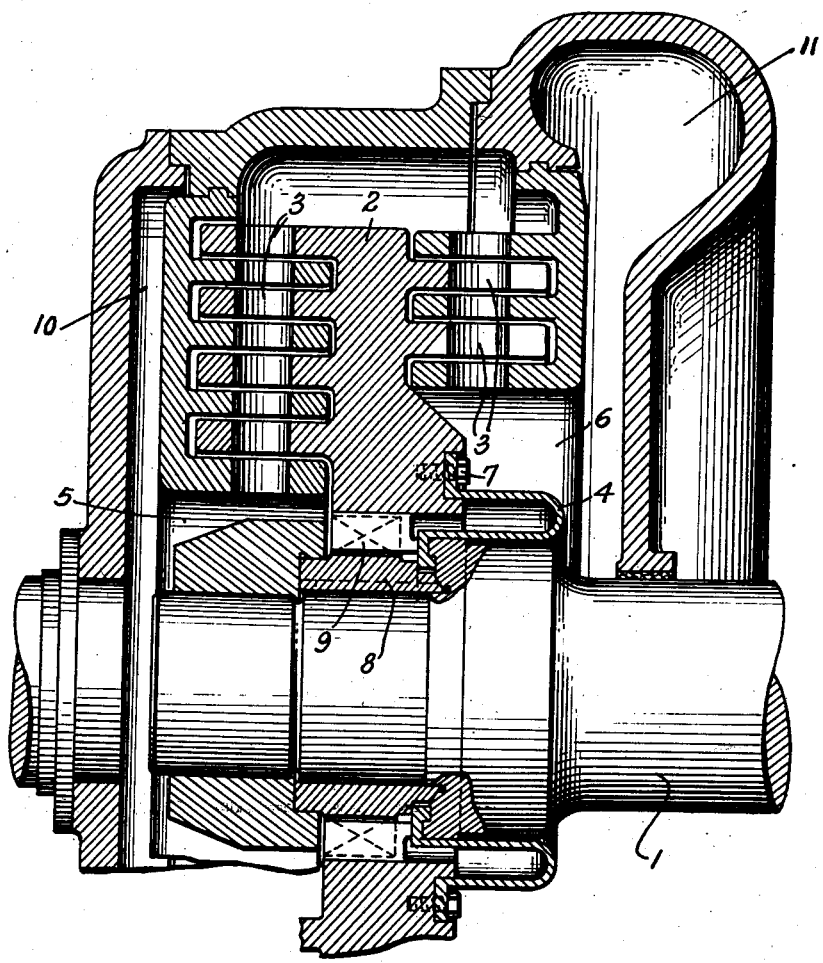
Inventor,
ERNST GENTE.
By Richardson & Auer
Atty.

Patented Sept. 29, 1942

2,297,210

UNITED STATES PATENT OFFICE 2,297,210

GAS TURBINE

Ernst Gente, Berlin-Siemensstadt, Germany; vested in the Alien Property Custodian Application July 24, 1939, Serial No. 286,235
In Germany July 23, 1938
6 Claims. (Cl. 253—87)

(Granted under the provisions of sec. 14, act of March 2, 1927; 357 O. G. 5)

This invention relates to an improvement in the arrangement of a rotating or stationary disc for centrifugal blowers, particularly for steam or gas turbines. The disc is secured to its carrier (shaft or housing) by means of an elastic packing member and both sides thereof are under the influence of the operating fluid. However, the temperatures at both sides of the disc differ in value. In the case of discs having large diameters and subjected to a great superatmospheric pressure acting at one side thereof, and operating within the range of high temperatures, the elastic packing member is subjected to particularly high stresses. To reduce these stresses the packing member is arranged, according to the invention, at that side of the disc, belonging to the space in which prevails the low temperature. In this manner either the packing member, if the same stress of the packing element is allowed, may be made thinner, i. e. more elastic, owing to the low temperature, or a material may be employed which is cheaper and easier to be procured. Furthermore, the material may be chosen according to particular requirements (a material resistant to corrosion, acid-proof and the like).

An embodiment of the invention is diagrammatically illustrated in the accompanying drawing.

Referring now to the drawing, numeral 1 denotes the shaft, 2 an impeller of a steam turbine having blade rings 3 at both sides thereof and integral therewith. The disc is secured to the shaft by means of an elastic packing member 4. The disc 2 is under the influence of the operating medium in such a manner that high pressure and high temperature prevail in the space 5, whereas low pressure and low temperature prevail in space 6. According to the invention, as shown in the drawing the packing member 4 is disposed in the space 6 in which prevails the low temperature. The packing element 4 is secured to the disc 2 by means of a screw 7 and to the shaft 1 by means of the claw intermediate piece 8. A lug 9 serves to transmit the torque from the disc 2 to the shaft 1 so that the ring is released of the torsional stresses.

The operating fluid enters through the space 10 at the left side of the machine into the space 5 and flows radially successively through the blades to the low temperature low pressure side 6 from where it escapes through the exhaust 11.

What is claimed is:

1. In a radial flow elastic fluid turbine or the like, wherein a blade-carrying disc is subjected to the action of said fluid, and wherein a different temperature of said fluid prevails on either side of said disc, a carrier member, connector means engaging the root of said disc for connecting the disc with said carrier member, an elastic packing member disposed immediately adjacent the root of said disc and said connector means and extending from said disc root on the low temperature side thereof so that it is exposed to said low temperature fluid, means for connecting said packing member at one end thereof with said carrier member, and means for connecting said packing member at the other end thereof with the root of said disc.

2. The structure and combination defined in claim 1, wherein said packing member is generally U-shaped in cross-section, together with an extension projecting angularly from the end of each leg thereof for connecting said packing member to said carrier member and to the root of said disc, respectively.

3. The structure and combination defined in claim 1, wherein a rotatable shaft constitutes said carrier member, said connector means coupling said disc with said shaft at the root of the disc and transmitting the torque thereto responsive to rotation of the shaft.

4. In a radial flow elastic fluid turbine or the like, wherein a blade-carrying disc is subjected to the action of said fluid, and wherein different fluid temperature and pressure prevail at the two sides of said disc, a rotatable shaft, a shoulder on said shaft, an elastic packing member which is generally U-shaped in cross-section for connecting said disc with said shaft, an angular extension projecting from one leg of said packing member for engagement with the shoulder on said shaft, key means on said shaft for securing said engagement, lug means extending radially with respect to said key means for connecting said shaft directly with the root of said disc, and an angular extension projecting from the other leg of said packing member for connecting the packing member with the root of said disc at the side thereof.

5. The structure and combination defined in claim 4, wherein said packing member projects sideways from the root of the disc at the low temperature low pressure side thereof and is exposed to the action of the fluid prevailing thereat.

6. The structure and combination defined in claim 4, wherein said lug means prevents transmission of torsional stresses to said packing member incident to rotation of said shaft and said disc.

ERNST GENTE.